United States Patent [19]
Citta

[11] Patent Number: 5,153,723
[45] Date of Patent: Oct. 6, 1992

[54] HDTV AUDIO SUBSYSTEM WITH TIMING CHARACTERISTICS COMPATIBLE WITH VIDEO SUBSYSTEM

[75] Inventor: Richard W. Citta, Oak Park, Ill.

[73] Assignee: Zenith Electronics Corporation, Glenview, Ill.

[21] Appl. No.: 734,841

[22] Filed: Jul. 24, 1991

[51] Int. Cl.$^5$ ............................................. H04N 7/04
[52] U.S. Cl. .................................................... 358/143
[58] Field of Search ........................ 358/141, 142, 143

[56] References Cited

U.S. PATENT DOCUMENTS

| | | |
|---|---|---|
| 4,336,553 | 6/1982 | den Toonder et al. ............ 358/120 |
| 4,340,906 | 7/1982 | den Toonder et al. ............ 358/124 |
| 4,353,088 | 10/1982 | den Toonder et al. ............ 358/120 |
| 4,424,532 | 1/1984 | den Toonder et al. ............ 358/120 |
| 4,429,332 | 1/1984 | Pargee, Jr. .......................... 358/143 |
| 4,851,909 | 7/1989 | Noske et al. .................... 358/143 X |
| 5,063,446 | 11/1991 | Gibson .............................. 358/143 X |

OTHER PUBLICATIONS

Digital Audio In Cable Systems, Oak Communications, Inc., M. Davidov; V. Blaskaran.

*Primary Examiner*—Victor R. Kostak

[57] ABSTRACT

An audio subsystem for use in an HDTV broadcast system includes a sampler for sampling an analog audio signal at a sampling rate of 3H, where H is the NTSC horizontal scanning frequency. The sampled audio signal is formatted into repetitive blocks which are supplied to a compressor at a rate comprising an integral multiple of the data transmission frame rate of the HDTV system. An HDTV signal including the compressed audio blocks and a compressed video signal is transmitted and received by an HDTV receiver. The receiver reproduces a wideband video signal for display at a horizontal scanning rate of NH, where N is an integer equal to or greater than two, and an expanded digital audio signal at a sampling rate of 3H for driving a speaker system.

23 Claims, 2 Drawing Sheets

HDTV AUDIO SUBSYSTEM WITH TIMING CHARACTERISTICS COMPATIBLE WITH VIDEO SUBSYSTEM

BACKGROUND OF THE INVENTION

The present invention generally relates to digital audio systems and particularly concerns the incorporation of a digital audio system in a high definition television broadcast system.

A number of HDTV systems have recently been proposed which provide for the digital transmission of a wideband video signal over a standard 6 MHz television channel. These systems typically initially compress a wideband video source signal and then transmit the compressed signal over a selected 6 MHz television channel. While various video compression systems are known in the art, temporally oriented systems seem to be presently preferred. Transmission may be effected, for example, by encoding the binary data representing the compressed signal as a series of N-level symbols, each symbol thereby representing N/2 bits of binary data.

Obviously, it would be highly desirable to provide for the transmission, preferably in a digital format, of an equally high quality audio signal as an accompaniment to the video signal. There area a number of known digital audio systems which are capable of providing the desired level of performance, but these systems have not been designed with a television application in mind. As a result, these systems cannot be directly incorporated into an HDTV system without causing certain problems. For example, since the sampling rates used in prior art digital audio systems are not compatible with the video timing signals in most HDTV systems, disturbing audible beats may result upon reproduction of the audio signal in an HDTV receiver. Also, the data rates of such audio systems are not compatible with HDTV transmission data rates which can lead to problems in accurately reproducing the audio signal, and particularly in effecting accurate error correction of the received audio signal.

It is therefore a basic object of the present invention to provide an improved HDTV system including compatible video and audio subsystems.

It is a more specific object of the present invention to provide an improved HDTV system including video and audio subsystems having compatible timing characteristics.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
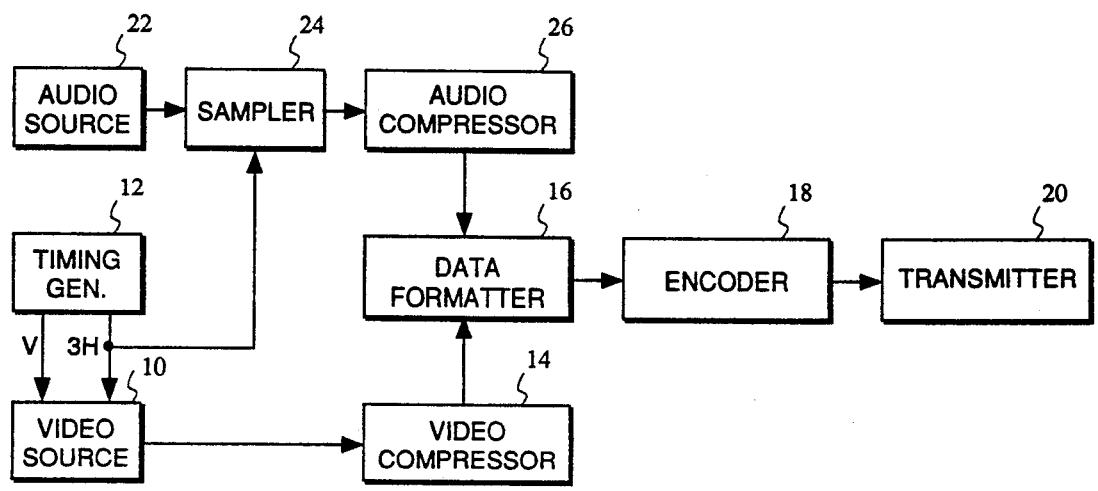
FIG. 1 is a block diagram of an HDTV transmitter constructed in accordance with the invention.

FIG. 1 illustrates an HDTV transmitter constructed in accordance with the invention. In its presently preferred embodiment, the transmitter incorporates a temporally-based video compression system and utilizes a suppressed carrier, vestigial sideband form of transmission. However, it is to be understood that the invention may be used with other types of video compression and transmission systems so that the details thereof should not be viewed as imposing any unnecessary limitations on the invention.

Referring in more detail to FIG. 1, a timing generator 12 couple a vertical synchronization signal V equal to the NTSC field rate (i.e. about 59.4 Hz) to one input of a video source 10 and a horizontal synchronization signal 3 H equal to three times the NTSC horizontal rate (i.e. about 47.25 KHz) to a second input of video source 10. In response to these synchronization signals, source 10 preferably provides a progressively scanned wideband digital video output signal (e.g. up to about 37 MHz) in the form of successive frames of binary video data having a vertical periodicity equal to V and a horizontal periodicity equal to 3 H. Each video frame thus comprises 787.5 lines and has a duration of 1/V. The output digital video signal is applied to a video compressor 14 which compresses the signal sufficiently to enable its transmission through a 6 MHz television channel. As mentioned previously, video compressor 14 preferably effects a temporally oriented compression algorithm.

Figure 2A:
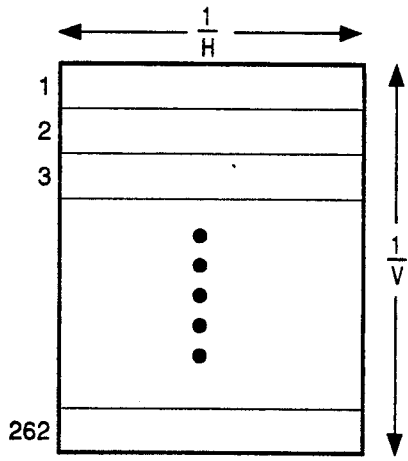
FIGS. 2A and 2B illustrate the data transmission frame structure of an HDTV signal in accordance with the invention.
Figure 2B:
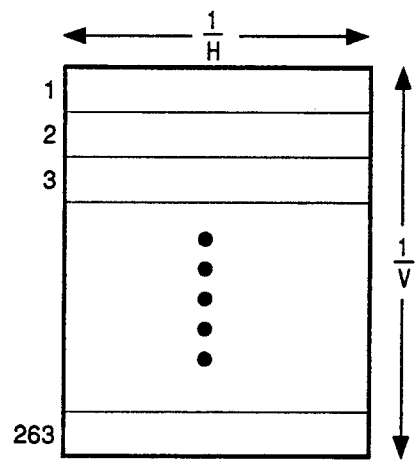

The output of video compressor 14 is applied to a data formatter 16 which formats the compressed video signal for transmission. The data transmission format is illustrated in FIGS. 2A and 2B and comprises alternating fields of 262 and 263 data segments, thereby providing a transmission frame comprising 525 data segments. The transmission fields are provided at the rate V, with each data segment having a duration 1/H and a data capacity of about 1176 bits of binary data. This provides sufficient data capacity to accommodate the compressed digital video signal, a data segment timing signal, a field timing signal, various auxiliary signals and several channels of digital audio.

Referring back to FIG. 1, the formatted data transmission frames are next applied to an encoder 18 which encodes the binary data into an N-level data signal prior to transmission. Encoder 18 may, for example, encode the binary data comprising each data segment into 684 four or two, or a combination of both, level symbols occurring at a rate of about 10.7 MHz (684 H). Thus, where four-level encoding is used each data segment represents 1368 bits of binary data and where two-level encoding is used each data segment represents 684 bits of binary data. Of course, within each segment some capacity must be reserved for timing and error correction information, the rest being available for the transmission of video, or as will be explained in more detail hereinafter, audio data. In any event, the N-level symbols developed by encoder 18 are coupled to a transmitter 20 for transmission, preferably in the form of a vestigial sideband, suppressed carrier signal.

An audio system may be incorporated in the HDTV transmitter of FIG. 1 as illustrated by coupling an analog audio signal from an audio source 22 to a sampler 24. Known prior art digital audio systems are operated at sampling rates of, for example, 48 KHz and, in the case of commercial CD technology 44.1 KHz. As will be explained in greater detail hereinafter, the receiver used in association with the HDTV transmitter of FIG. 1 preferably provides a display whose timing characteristics are identical to those characterizing the wideband video signal provided by source 10. Alternatively, the reproduced display may be characterized by a horizontal scanning rate of 2 H. As a consequence, a very strong 3 H (47.25 KHz) component in the preferred embodiment and a 2 H component in the alternate embodiment is generated in the receiver which may produce an audible beat in the reproduced audio signal if a sampling rate of 48 or 44.1 KHz is utilized. It will be appreciated that the strong 3 H or 2 H component results because a television receiver typically derives its power, high voltage and magnetic sweep signals from the horizontal deflection stage. These components can then leak into the audio system through various non-linear audio circuits such as D/A's and high power amplifiers resulting in beats between the audio sampling rate and the 2 H/3 H horizontal deflection component. Therefore, in accordance with one aspect of the present invention, the operation of sampler 24 is locked to the horizontal scanning rate 3 H as illustrated in FIG. 1 to minimize the creation of audible beats in the reproduced audio signal. Thus, the 3 H output of timing generator 12 is applied to sampler 24 to lock the sampling rate thereof to the horizontal scan frequency 3 H (i.e. 47.25 KHz). Sampler 24 is thereby operated for sampling each channel of the analog audio signal supplied by audio source 22 at a rate of 3 H (47.25 KHz). Assuming 16-bit samples, the output of sampler 24 is therefore provided at a data rate of about 756K bits per second per audio channel.

Figure 3:
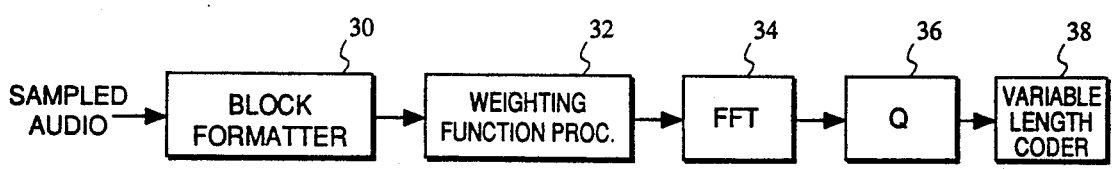
FIG. 3 is a block diagram of the audio compressor of FIG. 1.

The output of sampler 24 is supplied to an audio compressor 26 which preferably compresses the data representing each audio channel by a factor of about 6:1, thereby providing an output signal characterized by a data rate of about 126K bits per second per channel. Audio compressor 26, which may be largely conventional in design except for certain modifications described in more detail hereinafter, is shown in block diagram form in FIG. 3. The output of audio sampler 24 is applied to a block formatter 30 which repetitively couples blocks of audio samples of a predetermined size and at a predetermined rate to a fast fourier transform (FFT) coder 34 after being processed by a weighting function processor 32. The transform coefficients generated by FFT coder 34 in response to each block of input audio samples are applied to a quantizer 36 which appropriately quantizes the coefficients in a well known manner. Finally, the quantized coefficients are then applied to a variable length coder 38, e.g. a Huffman coder, and therefrom to data formatter 16. As mentioned previously, the output of variable length coder 38 is characterized by a data rate of about 126K bits per second per channel.

Figure 4A:
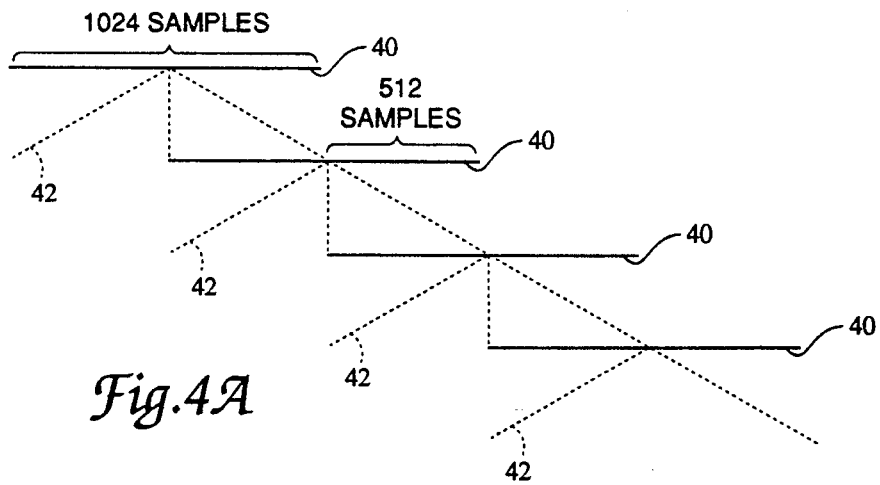
FIGS. 4A and 4B illustrate the operation of block formatter 30 and weighting function processor 32 of FIG. 3 according to the prior art and the present invention respectively.

FFT coders are available for conveniently and efficiently processing blocks of audio samples having a size which is an integral power of two. Block formatter 30 is therefore conventionally designed to repetitively provide output blocks of audio samples whose size is an integral power of two. Typically, each block comprises 1024 audio samples which are normally 100% overlapped as illustrated by audio blocks 40 in FIG. 4A to minimize block effects which could result in tonal beats in the reproduced audio signal. Thus, the first 512 samples of each audio block 40 comprises the last 512 samples of the immediately preceding block 40. In order to compensate for this overlap, it is conventional practice to weight each audio block 40 prior to applying it to FFT coder 34. This is effected by weighting function processor 32 which weights the samples in the respective audio blocks 40 according to a weighting function such as function 42 illustrated in dotted line in FIG. 4A. It will be seen that weighting function 42 comprises two linear portions, the first weighting audio samples according to a linear function which has a value of zero at the beginning of each block 40 and a value of one at the middle of the block and the second according to a linear function which has a value of one at the middle of the block and a value of zero at the end of the block. In this way, contributions from the various audio samples is maintained relative to their original values and some samples are not emphasized or de-emphasized relative to other samples. Alternatively, the weighting function 42 may take the form of a raised cosine function.

From the foregoing, it will be appreciated that the audio blocks 40 are provided to FFT coder 34 at a rate of 3 H/512 (47.25 KHz/512) or about 92.29 blocks/sec, which is equivalent to a bit rate of about 8192 bits/block. After processing by quantizer 36 and variable length coder 38, the audio blocks are provided to data formatter 16 at the same block rate, but at the reduced bit rate of about 1365 bits/block.

Figure 4B:
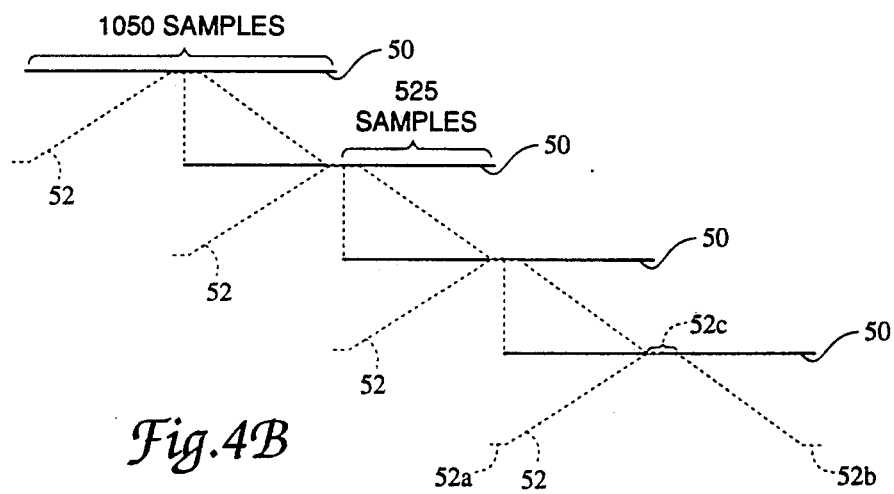

As mentioned previously, it would be highly desirable to provide for the transmission of each compressed audio block in a single data segment of the data transmission frame of FIGS. 2A and 2B. To achieve this, the audio block rate must be an integral multiple of the data frame rate. That is, the data frame rate H/525 multiplied by an integer N must be equal to the audio block rate. Obviously, this condition is not satisfied by the prior art system since, for the audio block rate 3 H/512, no value of N can be selected to satisfy the foregoing condition. In other words, the audio block rate 3 H/512 cannot be made equal to NH/525, where N is an integer. Thus, according to another aspect of the present invention, the size of the blocks of audio sample provided by block formatter 30 is modified such that each block contains 1050 samples instead of 1024 samples. Referring to FIG. 4B, wherein the modified audio blocks are designated by reference numeral 50, with a 100% overlap as illustrated, the block rate is now 3 H/525. With this modified rate, exactly three audio blocks per audio channel are provided during each data transmission frame (H/525) with each audio block being formatted for transmission in a corresponding data segment (see FIGS. 2A and 2B) by data formatter 16. This greatly simplifies accurate reproduction of the audio signal, in particular error detection and correction thereof, in the receiver.

While the modified audio block size of 1050 samples effectively solves the problem of synchronizing the audio block rate with the data transmission frame rate, it also introduces a system complication in connection with FFT encoder 34. As mentioned previously, for purposes of convenience and efficiency, FFT encoders are typically designed to process audio blocks comprising a number of samples which is an integral power of two. Since the modified block size of 1050 samples is not an integral power of two, such FFT encoders cannot be used to encode the audio signal. However, according to a further aspect of the present invention, the weighting function used to process the audio blocks between block formatter 30 and FFT encoder 34 is also modified such that as far as the encoder is concerned, it appears that only 1024 samples per block are being provided.

In particular, referring to FIG. 4B, the modified weighting function, which is designated by reference numeral 52, includes extended zero-value weighting portions 52a and 52b at respective ends of audio block 50, each of the portions 52a and 52b extending over a range of 13 audio samples. Thus, the first and last 13 samples of each audio block supplied to FFT encoder 34 will be forced to a zero value whereby only 1024 audio samples are in effect presented to the encoder for processing. In order to compensate for zero-value portions 52a and 52b, weighting function 52 includes a portion 52c centered in the middle of blocks 50 and adapted to weight the central 26 samples of each block with a value of one. That is, the right-hand of portion 52c of the weighting function covers 13 samples which overlaps the 13 samples coincident with portion 52a of the next block and the left-hand half of portion 52c covers the 13 samples which overlaps the 13 samples coincident with portion 52b of the previous block. In this manner, the effective weighting of each audio sample is uniformly maintained at a value of one.

Therefore, in accordance with the invention, compressed audio blocks are supplied to data formatter 16 at a rate of three blocks per audio channel per transmission frame, with each block comprising about 1365 bits of information. Each of these blocks is formatted for transmission in a respective data segment of the transmission frame prior to being applied to encoder 18. Encoder 18 encodes each formatted data segment as a series of 684 4-level symbols for transmission by transmitter 20.

Figure 5:
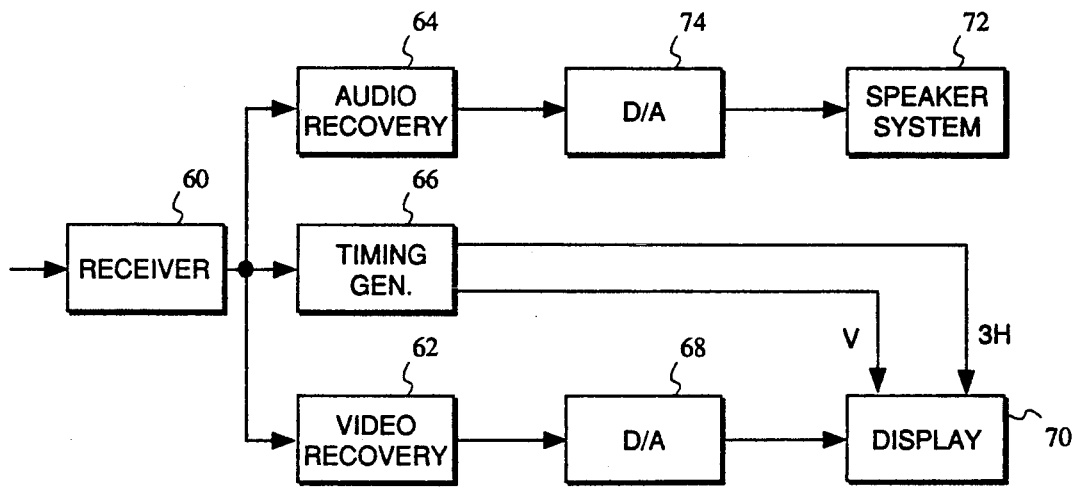
FIG. 5 is a block diagram of an HDTV receiver constructed according to the invention.

Referring now to FIG. 5, an HDTV receiver constructed according to the invention includes a signal receiver 60 supplying a recovered baseband signal to a video recovery circuit 62, an audio recovery circuit 64, and a timing generator 66. The output of video recovery circuit 62 comprises an expanded digital video signal which is converted to an analog signal by D/A 68 and applied to a suitable display 70. Timing generator 66 develops a vertical deflection signal at the rate V and a horizontal deflection signal at the rate 3 H which are also applied to display 70. Display 70, in response to the analog video signal and the horizontal and vertical deflection signals produces a progressively scanned display comprising 787.5 lines per frame and having a frame rate of V and a horizontal scanning rate of 3 H.

The output of audio recovery circuit 64, which comprises an expanded digital audio signal at a sampling rate of 3 H, is supplied to a suitable speaker system 72 through a D/A 74. Since the sampling rate of the audio signal is equal to 3 H, it will be appreciated that no tonal beats will be reproduced in response to the strong 3 H horizontal deflection signal present in the receiver.

What has thus been described is a novel HDTV system including compatible audio and video subsystems. It is recognized that numerous changes and modifications of the described embodiments will be apparent to those skilled in the art without departing from the true spirit and scope of the invention. The invention is therefore to be limited only as defined in the claims.

That which is claimed is:

1. An audio processor for use in an HDTV system of the type including a receiver for reproducing a televised video image in response to a horizontal scanning rate signal of frequency NH, where H is the NTSC horizontal scanning frequency and N is an integer equal to or greater than two, comprising:
   means for providing an analog audio signal;
   means for sampling said analog audio signal at a sampling rate equal to 3 H; and
   means for compressing said sampled audio signal, whereby a reproduction of said analog audio signal may be provided in said receiver in response to said compressed audio signal which includes substantially no undesired beat components due to said horizontal scanning rate signal.

2. The audio processor of claim 1 wherein said HDTV system includes means for providing a video signal at a horizontal repetition rate of 3 H and further including means for locking said sampling rate to said horizontal repetition rate.

3. The audio processor of claim 1 including means for supplying said sampled audio signal to said compressing means in the form of repetitive blocks of audio samples, the blocks being supplied at a rate which is an integral multiple of the data transmission frame rate of said HDTV system.

4. The audio processor of claim 3 wherein said supplying means comprises means for supplying said audio blocks at a rate equal to 3 H/525 for each channel of said audio signal.

5. The audio processor of claim 3 wherein said HDTV system includes a data transmission frame comprising 525 successive data segments and further including means for encoding each of said compressed audio blocks for transmission in a respective one of said data segments.

6. The audio processor of claim 5 wherein, for each channel of said audio signal, three of said compressed audio blocks are encoded for transmission in said transmission frame.

7. The audio processor of claim 6 wherein each of said data segments has a duration of 1/H and wherein each of said compressed audio blocks is encoded in the form of a series of 4-level data symbols for transmission in a respective one of said data segments.

8. The audio processor of claim 3 wherein said supplying means comprises means for formatting said audio signal in repetitive blocks of 1050 audio samples which are supplied in 100% overlapping relation to each other.

9. The audio processor of claim 3 including means for modifying the audio blocks supplied to said compressing means such that the maximum number of consecutive non-zero samples of each is less than or equal to a predetermined power of two.

10. The audio processor of claim 9 wherein said supplying means comprises means for formatting said audio signal in repetitive blocks of 1050 audio samples which are supplied in 100% overlapping relation to each other and wherein said predetermined power of two comprises 1024.

11. An audio processor for use in an HDTV system of the type including a receiver for reproducing a televised video image at a horizontal scanning rate of NH, where H is the NTSC horizontal scanning frequency and N is an integer equal to or greater than two, comprising:
    means for providing an analog audio signal;
    means for sampling said analog audio signal at a sampling rate equal to 3 H;
    means for formatting said sampled audio signal into repetitive blocks of audio samples and supplying said blocks at a rate which is an integral multiple of the data transmission frame rate of said HDTV system; and means for compressing said audio blocks supplied by said formatting means.

12. The audio processor of claim 11 wherein said formatting means comprises means for formatting said sampled audio signal into repetitive 100% overlapped blocks of 1050 samples and supplying said blocks at a rate equal to 3 H/525 for each channel of said audio signal.

13. The audio processor of claim 12 including means for modifying the audio blocks supplied to said compressing means such that the maximum number of consecutive non-zero samples of each is less than or equal to 1024.

14. An HDTV receiver comprising:

means for receiving an HDTV signal including a compressed digital video component and a compressed digital audio component, said compressed digital audio component representing an analog audio signal sampled at a sampling rate 3 H, where H is the NTSC horizontal scanning frequency;

means responsive to said received digital video component for providing an expanded digital video signal;

means responsive to said received digital audio component for providing an expanded digital audio signal at a sampling rate of 3 H;

means responsive to said expanded digital video signal for displaying a video image at a horizontal scanning rate NH, where N is an integer greater than or equal to two; and means responsive to said expanded digital audio signal for providing a reproduction of said analog audio signal.

15. The receiver of claim 14 wherein said digital audio component is received in the form of repetitive blocks of audio samples which occur at a rate comprising an integral multiple of the data transmission frame rate of said HDTV signal.

16. The receiver of claim 15 wherein said received HDTV signal is characterized by a data transmission frame comprising 525 successive data segments, each having a duration 1/H, each of said audio blocks being received during a respective one of said data segments.

17. The receiver of claim 16 wherein said blocks of audio samples are received at a rate of 3 H/525 for each channel of said audio signal.

18. The receiver of claim 17 wherein said audio blocks are received in the form of a series of 4-level data symbols.

19. An audio subsystem for use in an HDTV receiver of the type reproducing a televised image in response to a horizontal scanning rate signal of frequency NH, where H is the NTSC horizontal scanning frequency and N is an integer equal to or greater than two, comprising:

means for receiving an HDTV signal including a compressed digital audio signal sampled at a sampling rate 3 H;

means responsive to said received digital audio signal for providing an expanded digital audio signal at a sampling rate of 3 H; and means responsive to said expanded digital audio signal for reproducing an analog audio component including substantially no undesired beat components due to said horizontal scanning rate signal.

20. The audio subsystem of claim 19 wherein said compressed digital audio signal is received in the form of repetitive blocks of audio samples which occur at a rate comprising an integral multiple of the data transmission frame rate of said HDTV signal.

21. The audio subsystem of claim 20 wherein said received HDTV signal is characterized by a data transmission frame comprising 525 successive data segments, each having a duration 1/H, each of said audio blocks being received during a respective one of said data segments.

22. The audio subsystem of claim 21 wherein said blocks of audio samples are received at a rate of 3 H/525 for each channel of said audio signal.

23. The audio subsystem of claim 22 wherein said audio blocks are received in the form of a series of 4-level data symbols.

* * * * *